United States Patent
Rubens et al.

[15] 3,694,416
[45] Sept. 26, 1972

[54] INTERPOLYMERS OF ALIPHATIC CONJUGATED DIENES AND BLOCKED VINYL ISOCYANATES

[72] Inventors: Louis C. Rubens, James T. K. Woo, both of Midland, Mich. 48640

[73] Assignee: The Dow Chemical Company, Midland, Mich.

[22] Filed: Nov. 30, 1970

[21] Appl. No.: 93,884

[52] U.S. Cl. ....260/77.5 TB, 117/123 D, 117/132 B, 117/148, 117/155 R, 260/77.5 BB, 260/859 R
[51] Int. Cl. ..............................................C08g 22/32
[58] Field of Search..................260/77.5 BB, 77.5 TB

[56] References Cited

UNITED STATES PATENTS 2,326,287   8/1943   Coffman...................260/85.7

Primary Examiner—Donald E. Czaja
Assistant Examiner—M. J. Welsh
Attorney—Griswold & Burdick, Ronald G. Brokkens and Albin R. Lindstrom

[57] ABSTRACT

This invention is directed to interpolymers of aliphatic conjugated dienes and blocked vinyl isocyanates which are particularly useful for forming self-anchoring coatings on various substrates and for the preparation of cross-linked or cross-linkable molding resins.

3 Claims, No Drawings

INTERPOLYMERS OF ALIPHATIC CONJUGATED DIENES AND BLOCKED VINYL ISOCYANATES

BACKGROUND

The copolymerization of vinyl and vinylidene compounds and vinyl isocyanates for the preparation of coating compositions is known, e.g., as disclosed in U.S. Pat. No. 2,326,287. Heretofore, however, interpolymers of the aliphatic conjugated dienes and "-blocked" vinyl isocyanates, as herein described, have not been disclosed by the prior art. Further, the preparation of curable coatings or molded resins prepared from interpolymers of aliphatic conjugated dienes and vinyl isocyanates having free isocyanate functionalities has heretofore not been possible due to the pronounced moisture sensitivity of such interpolymers resulting from the reactivity of the isocyanate groups.

It is the primary object of the present invention to prepare interpolymers composed of predominant amounts of aliphatic conjugated dienes and minor amounts of blocked vinyl isocyanates wherein the NCO groups of the vinyl isocyanate will be available for cross-linking with other polymer materials to form molding resins of desirably high impact strength and/or for the formation of curable protective or adhesive coatings on various substrates.

Other and related objects will become evident from the following specification and claims.

SUMMARY OF THE INVENTION

The above and related objects are attained according to the present invention by preparation of interpolymers consisting essentially of (1) at least about 75 weight percent of an aliphatic conjugated diene having from about four to 10 carbon atoms, (2) from 1 to about 15 weight percent of a blocked vinyl isocyanate and (3) the remainder being one or more copolymerizable ethylenically unsaturated monomers.

DESCRIPTION OF THE PREFERRED EMBODIMENTS

The aliphatic conjugated dienes used herein have, in general, from four to 10 carbon atoms and are represented by 1,3-butadiene, isoprene, 2-methyl-1,3-butadiene, 2,3-dimethyl-1,3-butadiene, piperylene, 2-neopentyl-1,3-butadiene and other hydrocarbon homologs of 1,3-butadiene such as the straight- and branched-chain pentadienes, and the straight-and branched-chain hexadienes. Especially preferred are 1,3-butadiene and isoprene.

"Blocked" vinyl isocyanates are described by F. H. Saunders and K. C. Frisch, in Polyurethanes Chemistry and Technology, Part I Chemistry, Volume 16 High Polymers, Interscience, 1966, page 120; and in an article by G. R. Griffin and L. F. Willwerth, entitled "The Thermal Dissociation of Blocked Toluene Diisocyanates", Product Research and Development, Industrial Engineering and Chemistry, Volume 1, number 4, Dec. 1962.

Illustrative of the blocked vinyl isocyanates which have been found to be particularly useful for the purposes of the present invention are the materials having the general structure:

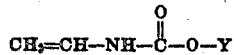

where Y is

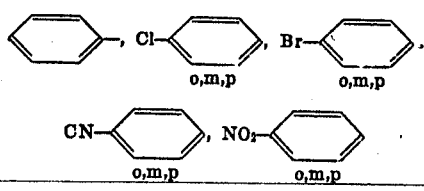

distributed up to pentasubstituted; and

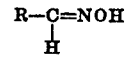

where R is alkyl or aryl.

In addition to the required classes of monomers specified above, there may be used small amounts of other ethylenically unsaturated monomers as copolymerized constituents according to this invention. Typical such other monomers are the monovinylidene aromatic compounds of the benzene series such as styrene and substituted styrenes including alpha-methylstyrene, p-vinyltoluene, o-vinyltoluene, p-tert.-butylstyrene, ar-ethylstyrene, ar-dimethylstyrene, methoxystyrene, ethoxystyrene, cyanostyrene, monochlorostyrene, dichlorostyrene, monobromostyrene and other halostyrenes. Other useful monomers include the acrylonitriles such as acrylonitrile and methacrylonitrile, the alkyl esters of an acrylic acid in which the alkyl portion has from one to 12 carbon atoms, such as methyl acrylate, methyl methacrylate, ethyl acrylate, ethyl methacrylate, n-propylacrylate, n-propyl methacrylate, isopropyl acrylate, isopropyl methacrylate, n-butyl acrylate, n-butyl methacrylate, isobutyl acrylate, isobutyl methacrylate, 2-ethylhexyl acrylate, 2-ethylhexyl methacrylate, n-octyl acrylate, n-octyl methacrylate, n-decyl methacrylate, and dodecyl methacrylate; ethylenically unsaturated esters of saturated carboxylic acids such as vinyl acetate and vinyl propionate; the ethylenically unsaturated ketones such as methyl isopropenyl ketone; and the hydroxyl-containing alkyl esters of $\alpha,\beta$-ethylenically unsaturated carboxylic acids such as $\beta$-hydroxyethyl acrylate, $\beta$-hydroxylpropyl acrylate, $\beta$-hydroxyethyl methacrylate, $\beta$-hydroxypropyl methacrylate, 4-hydroxybutyl acrylate, 4-hydroxybutyl methacrylate and 5-hydroxyamyl methacrylate.

The copolymerized monomers in the interpolymers are present in amount, based on total interpolymer weight of (1) at least about 75 weight percent of aliphatic conjugated diene, (2) from about 1 to about 15 weight percent of said blocked vinyl isocyanate and (3) the remainder being one or more ethylenically unsaturated comonomer.

The monomers may be copolymerized by any known method to form the interpolymers useful for the present invention. For example, the polymerization reaction may be conducted in aqueous emulsions containing a catalyst, Typical of such catalysts are the water-soluble per-compounds, mixtures of water-soluble and monomer-soluble per-compounds, and other compounds having similar decomposition mechanisms such as 2,2'-azobisisobutyronitrile; and in the presence of well known emulsifying and/or dispersing agents. Alternatively, the interpolymers may be prepared by polymerization of the monomeric components in bulk without added diluent, or the monomers may be reacted in appropriate organic solvent reaction media.

While there is no critical order of addition of the various components of the monomeric mixture to be polymerized, a convenient manner of carrying out the process is to mix the preformed "blocked" vinyl isocyanate with the remaining monomers in an aqueous medium containing the catalyst. The various components of the monomeric mixture to be polymerized can also be conveniently premixed and added to the aqueous medium containing the catalyst.

The so-formed interpolymers may be advantageously utilized as coating materials in the form of aqueous dispersion or solvent solutions to provide transparent, continuous protective or adhesive coatings on substrates such as wood, concrete, metal and paper, upon curing such coatings at a temperature sufficient to unblock the isocyanate groups. Further, such interpolymers may be utilized as molding materials wherein the prescribed interpolymer is molded with another polymeric material, e.g., styrene–hydroxyethylacrylate or hydroxyterminated polyester to provide high impact materials.

The practice of this invention, as well as the benefits and advantages that accrue therefrom, are illustrated in the following example where all parts and percentages are by weight, unless otherwise specified.

EXAMPLE

A. Preparation of P-chlorophenyl Vinylcarbamate

15 Gms. of p-chlorophenyl was dissolved in 150 ml. of anhydrous ether and 50 mg. NaH added. Thereafter, 16 ml. of vinyl isocyanate was slowly added and the ether evaporated leaving a white solid which was washed with dilute NaOH and then with water. The washed product was then dried overnight at room temperature under vacuum to form a product having a melting point of 131° C.

B. Preparation of a Copolymer of Butadiene and P-chlorophenyl Vinylcarbamate 51.4 Gms. (0.95 mole) of anhydrous butadiene and 9.5 gms. (0.05 mole) of the p-chlorophenyl vinylcarbamate was dissolved in 100 cc of distilled acetone in a citrate bottle and 0.5 gm. of azobisisobutyronitrile was added. The resulting solution was permitted to polymerize for a period of 72 hours at 70° C in a Bendix Roto water bath. 17.5 Gms. (30 percent conversion) of a whitish rubbery solid was obtained. The nuclear magnetic resonance (NMR) spectrum of the copolymer in perchloroethylene indicated a structure of the following:

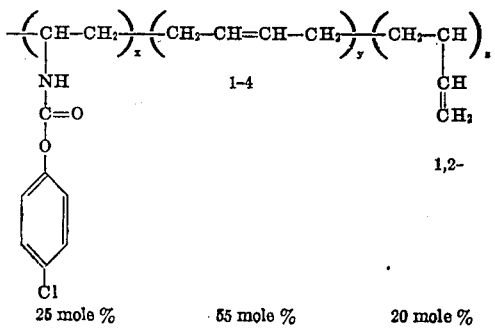

The molecular weight of the polymer was 480 (by boiling point elevation method in trichloroethylene as solvent). This data suggests that in the copolymer, $X = 1$, $y = 2$ and $z = 1$, giving an oligomer of 3 butadiene units and 1 unit of the p-chlorophenol-VNCO adduct in a molecule of the polymer. Elemental analysis: C:72.3%, H:7.99%, N:3.7%.

C. Utilization of the Copolymer of (B) as a Coating Material 1.6 Gms. of the herein described copolymer was dissolved in 6 cc of tetrahydrofuran and coatings were made from the solution on a steel Q panel.

Coatings which were not subsequently baked were characterized by a powderlike, rough surface an did not adhere to the panel. By way of comparison, coatings which were heated at 160° C under vacuum for 10 minutes (to regenerate the isocyanate functionalities) became clear and were characterized by a forward and reverse impact of 10 in./lb. (Gardner impact tester).

By way of further comparison, coatings similarly prepared using a copolymer of butadiene and vinyl isocyanate (prepared essentially as described in (B) above) failed to adhere to the metal panel.

What is claimed is:

1. Interpolymers consisting essentially of (1) at least about 75 weight percent of an aliphatic conjugated diene having from about 4 to 10 carbon atoms and (2) from 1 to about 15 weight percent of a blocked vinyl isocyanate and (3) the remainder being one or more copolymerizable ethylenically unsaturated monomers.

2. The interpolymers of claim 1 wherein said blocked vinyl isocyanate is selected from the group consisting of the materials having the structure:

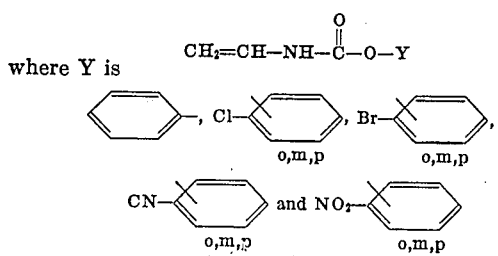

3. The interpolymers of claim 2 wherein said aliphatic conjugated diene is butadiene and said blocked vinyl isocyanate is p-chlorophenyl vinylcarbamate.

* * * * *